United States Patent
Falk

(10) Patent No.: US 10,422,378 B2
(45) Date of Patent: Sep. 24, 2019

(54) BEARING ARRANGEMENT FOR A MUTUALLY TURNABLE UNIT WORKING UNDER HIGH PRESSURE

(71) Applicant: Hudiksvalls Teknikcentrum AB, Hudiksvall (SE)

(72) Inventor: Kurt Falk, Hudiksvall (SE)

(73) Assignee: Hudiksvalls Teknikcentrum AB, Hudiksvall (SE)

(*) Notice: Subject to any disclaimer, the term of this patent is extended or adjusted under 35 U.S.C. 154(b) by 0 days.

(21) Appl. No.: 15/781,694

(22) PCT Filed: Dec. 9, 2016

(86) PCT No.: PCT/SE2016/051241
§ 371 (c)(1),
(2) Date: Jun. 5, 2018

(87) PCT Pub. No.: WO2017/099664
PCT Pub. Date: Jun. 15, 2017

(65) Prior Publication Data
US 2018/0363705 A1 Dec. 20, 2018

(30) Foreign Application Priority Data
Dec. 11, 2015 (SE) .................................. 1551629

(51) Int. Cl.
*F16C 32/06* (2006.01)
*F16C 33/74* (2006.01)
(Continued)

(52) U.S. Cl.
CPC .......... *F16C 32/0655* (2013.01); *F01C 9/002* (2013.01); *F01C 21/02* (2013.01);
(Continued)

(58) Field of Classification Search
CPC ........ F16C 32/064; F16C 33/74; F16C 43/04; F16C 2226/02; F16C 2310/00;
(Continued)

(56) References Cited

U.S. PATENT DOCUMENTS 2,402,377 A * 6/1946 Davenport ............ F01D 25/166
384/110
2,796,027 A * 6/1957 Brown ...................... F04D 7/06
415/11
(Continued)

FOREIGN PATENT DOCUMENTS

EP 2078861 A2 7/2009
EP 2500264 A2 9/2012
(Continued)

OTHER PUBLICATIONS

International Search Report from corresponding International Patent Application No. PCT/SE2016/051241, dated Jan. 31, 2017.

*Primary Examiner* — Marcus Charles
(74) *Attorney, Agent, or Firm* — Tucker Ellis LLP

(57) ABSTRACT

A bearing arrangement for a unit that is mutually turnable around a center of rotation (R) comprising an external part (1) and an internal part (7), which, with the aid of high hydraulically acting pressure, is arranged to achieve a reciprocating rotary motion, or that is arranged to achieve a high hydraulic pressure from an applied torque from a reciprocating motion, whereby the external part (1) is provided with side walls arranged to axially surround at least a part of the internal part (7), and whereby the external part (1) comprises a radially inwardly arranged and essentially surrounding cavity (11, 12, 13, 14) in which the internal part (7) is arranged such that it can be rotated, which cavity (11, 12, 13, 14) is limited in the circumferential direction by at least one wing (3, 4) that protrudes inwards from the external part (1) and also limited by at least one wing (9, 10) that protrudes (Continued)

radially outwards from the internal part (7), which wings (3, 4, 9, 10) limit at least two chambers or compartments (11, 12, 13, 14) between the external part (1) and the internal part (7). At least one of the side walls of the external part is fixed connected with the, at least one, wing (3, 4) that protrudes radially inwards towards the internal part (7), which wing demonstrates a surface that faces radially inwards and that has a circular concave curvature for connection with an outwardly facing circular convex contact surface (8) at the internal part (7).

7 Claims, 5 Drawing Sheets

(51) Int. Cl.
| | |
|---|---|
| *F16C 33/66* | (2006.01) |
| *F04C 27/00* | (2006.01) |
| *F04C 2/00* | (2006.01) |
| *F03C 4/00* | (2006.01) |
| *F15B 15/12* | (2006.01) |
| *F16D 1/033* | (2006.01) |
| *F04C 9/00* | (2006.01) |
| *F01C 9/00* | (2006.01) |
| *F01C 21/02* | (2006.01) |
| *F01C 21/10* | (2006.01) |

(52) U.S. Cl.
CPC .............. *F01C 21/108* (2013.01); *F03C 4/00* (2013.01); *F04C 2/00* (2013.01); *F04C 9/002* (2013.01); *F04C 27/00* (2013.01); *F15B 15/12* (2013.01); *F16C 32/064* (2013.01); *F16C 33/664* (2013.01); *F16C 33/6659* (2013.01); *F16D 1/033* (2013.01); *F04C 2240/50* (2013.01); *F04C 2240/54* (2013.01); *F04C 2240/805* (2013.01); *F16C 33/74* (2013.01); *F16C 2310/00* (2013.01); *F16C 2322/34* (2013.01); *F16C 2360/23* (2013.01)

(58) Field of Classification Search
CPC ........ F16C 2322/34; F03C 4/10; F15B 15/12; F16D 1/033; F04C 2/00; F04C 9/002; F04C 27/00; F04C 2240/50; F04C 2240/54; F04C 2240/805; F01D 25/166; F01D 25/186
USPC ......... 384/91, 100, 130, 286, 289, 474, 477, 384/489; 515/229; 415/229, 170.1
See application file for complete search history.

(56) References Cited

U.S. PATENT DOCUMENTS

| | | | | |
|---|---|---|---|---|
| 2,934,045 | A | | 4/1960 | Shafer |
| 6,379,046 | B1 | * | 4/2002 | Zeidan .................... F16C 17/03 384/117 |
| 6,893,208 | B2 | * | 5/2005 | Frosini ................... F01D 25/16 184/6 |
| 8,079,805 | B2 | * | 12/2011 | Maier .................... B01D 45/12 415/115 |
| 2001/0045195 | A1 | * | 11/2001 | Neller .................... F01L 1/3442 123/90.15 |
| 2007/0125320 | A1 | | 6/2007 | Smith |
| 2007/0296296 | A1 | | 12/2007 | Masuda |
| 2008/0138005 | A1 | * | 6/2008 | Aira ........................ E02F 9/006 384/385 |
| 2014/0099199 | A1 | * | 4/2014 | Kerr .................... F16C 33/6677 415/229 |

FOREIGN PATENT DOCUMENTS

| | | | | |
|---|---|---|---|---|
| GB | 479290 | A | * 1/1938 | ............. F16C 33/74 |
| GB | 835529 | A | * 5/1960 | ........... F01D 25/164 |
| GB | 1099183 | A | 1/1968 | |
| GB | 2030652 | A | 4/1980 | |
| SE | 324105 | B | 5/1970 | |
| WO | 9858178 | A1 | 12/1998 | |
| WO | 02/046580 | A1 | 6/2002 | |
| WO | 03/093650 | A1 | 11/2003 | |
| WO | 2013172761 | A1 | 11/2013 | |
| WO | WO-2016084937 | A1 | * 6/2016 | ............. F01D 25/18 |

* cited by examiner

BEARING ARRANGEMENT FOR A MUTUALLY TURNABLE UNIT WORKING UNDER HIGH PRESSURE

FIELD OF THE INVENTION

The present invention concerns a bearing arrangement for a unit that is mutually turnable around a centre of rotation, comprising an external part and an internal part, that is arranged to achieve with the aid of a high hydraulically acting pressure a reciprocating rotary motion, or that is arranged to achieve a high hydraulic pressure from a torque that is applied from a reciprocating motion. The invention is principally intended to achieve a reciprocating rotary motion of magnitude less than 360°, and in particular less than 180°.

The mutually turnable unit can be likened to a stator and a rotor that can be rotated relative to the stator, where, however, according to the invention, the external part may, depending on the design, act as stator or as rotor, and in a corresponding manner the internal part may act as rotor or as stator.

The external part is arranged such that it radially completely surrounds, and axially surrounds at least a part of the internal part, and it comprises a central hole such that it can be mounted on a turnable shaft. The external part is made up from two side parts that axially surround a part of the internal part and an external ring part arranged between the side parts and that radially surrounds the internal part. Furthermore, the external part limits, with the aid of the external ring part, an essentially surrounding cavity that is arranged radially inwards, in which the internal part is arranged such that it can be rotated. Furthermore, the external part demonstrates at its ring part one, two or more wings arranged to protrude into the cavity in a radially inwards direction, and in a corresponding manner the internal part is provided with one, two or more wings arranged to protrude into the cavity in a radially outwards direction. There are in this way formed in the cavity at least two chambers, limited in the outwards direction by the external part and in the inwards direction by the internal part, and limited in the circumferential direction by sides of the wings of the internal and external parts, which wings protrude into the cavity. Through the supply of hydraulic oil under pressure to one or several of the chambers, the external and internal parts in the turnable unit can be caused to rotate relative to each other.

BACKGROUND OF THE INVENTION

One example of a unit of the type described above can be found in, for example, WO 2013/172761, where the external unit and the internal unit each demonstrates in the embodiment shown in FIG. 11 two wings, achieving in this way four chambers in the unit, which chambers can be influenced by hydraulic pressure in order to rotate the moveable part relative to the fixed part.

A unit of the type described above can work with the absorption of extremely high external forces during rotation, and it can achieve this in all directions, for example axial, radial and tangential forces, and combinations of these. In order to avoid wear of the component parts, a bearing film of oil must be available between the contact surfaces of all component parts of the turnable unit.

One problem that then arises as a consequence of the necessity that the bearing film of oil between the contact surfaces have a high hydrostatic pressure between the contact surfaces and the necessity that these be able to move in two opposing directions is that it is not possible to use elastomer seals to seal between the mutually turnable parts. It is also a problem to obtain sufficiently high hydraulic pressure against the wings in order to be able to achieve high torques, as a consequence of leakage, given the lack of seals around the wings. In this way also the hydraulic efficiency of the unit will be low.

When the turnable unit is put under hydraulic pressure, it attempts to expand, which leads, in particular, to the side walls of the external part bulging outwards, in which way the play that is present between the wings of the internal parts and the side walls can increase markedly, in which way internal leakage within the unit increases, and in this way the hydraulic efficiency is noticeably reduced.

A doubling of the play between two parts leads to the volume of leakage between the two parts increasing by a factor of eight, such that, for a turnable unit that functions at high pressure, it is important to be able to maintain the play between the two mutually turnable parts as low as possible and at a pre-determined fixed level in order for the turnable unit to be able to work efficiently and in the manner intended.

BRIEF SUMMARY OF THE INVENTION

It is, therefore, one purpose of the invention to solve the problems with leakage described above and to achieve a new and improved bearing arrangement for a mutually turnable unit, comprising an external part and an internal part, that is arranged to achieve with the aid of a high hydraulically acting pressure a reciprocating rotary motion, as has been described above.

The purpose of the invention described above is achieved with a bearing arrangement in which, according to the invention, at least one of the side walls of the external part is fixed connected with the, at least one, wing that protrudes radially inwards towards the internal part.

According to one preferred embodiment of the bearing arrangement, the side walls of the external part are bolted fixed to each other, whereby one of the side walls is bolted fixed also to the, at least one, wing that protrudes radially inwards towards the internal part.

According to a further embodiment of the preferred embodiment of the invention described above, one of the side walls is designed integrated with the, at least one, wing that protrudes radially inwards towards the internal part.

According to a further embodiment of the invention, the two side walls of the external part are designed as one piece and the, at least one, wing that protrudes radially inwards towards the internal part is designed by the milling of a groove that passes round the circumference and that connects to the, at least one, wing.

According to a preferred embodiment of the invention, the external part comprises two wings that protrude radially inwards towards the internal part, and the internal part comprises two wings that protrude radially outwards towards the external part, whereby the wings limit four chambers between the external part and the internal part.

According to a further embodiment of the invention in which the wings limit four chambers, two diametrically located chambers are connected in pairs to each other through pressure-equalisation passages that pass through the internal part.

A bearing arrangement according to the invention can advantageously be used as a damper for shaft oscillations of the propulsion chains of generators, gas turbines and refiners, in which torsional oscillations can arise when the unit is placed under different loads. In such applications, compressional loads of up to at least 1200 bar, at an external diameter of 240 mm and an axial width of 70 mm, can be handled by the bearing arrangement according to the invention. The bearing arrangement can be used also for a mutually turnable unit that acts as a pump. The bearing arrangement can be used also at a turnable unit for, for example, a turnable saw blade in a forestry machine. In such an application, it is a case of considerably lower pressures than that specified above, for example up to approximately 250 bar.

BRIEF DESCRIPTION OF THE SEVERAL VIEWS OF THE DRAWINGS

The invention will now be described in more detail in the form of a non-limiting embodiment as an example, shown with a design that is in particular suitable to achieve a reciprocating rotary motion for a saw blade in a forestry machine. The drawings show as follows.

DETAILED DESCRIPTION OF THE INVENTION

Figure 1:
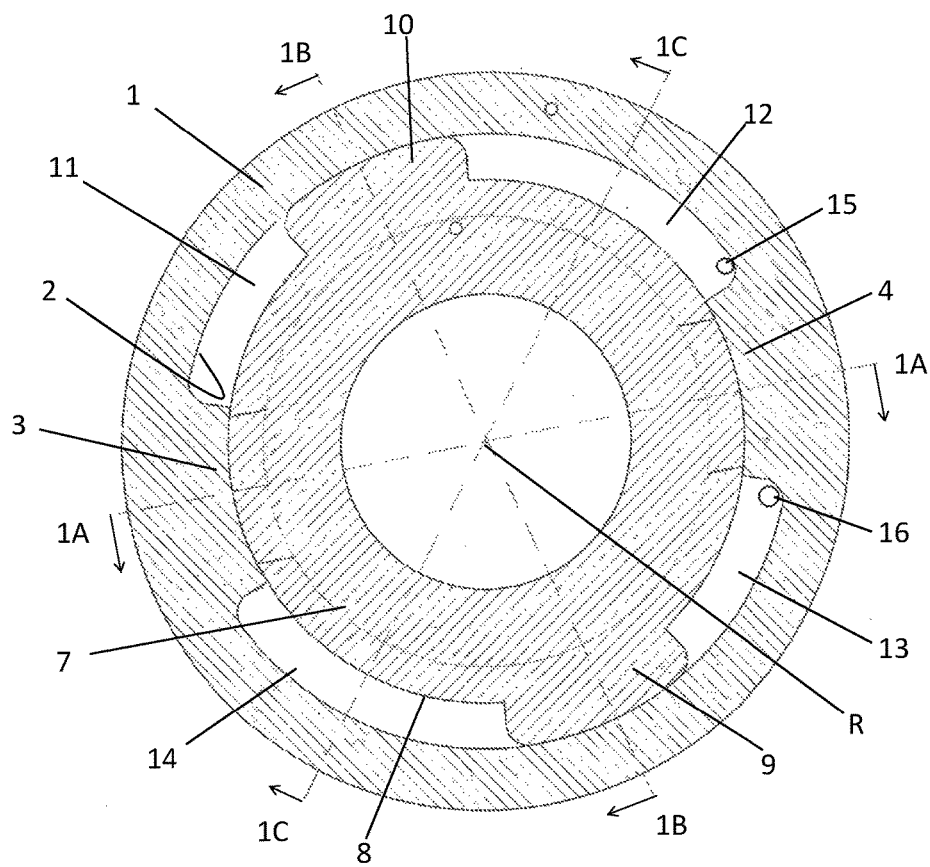
FIG. 1 shows a schematic cross-section through a turnable unit in which the bearing arrangement according to the invention is applied.

Thus, FIG. 1 shows a turnable unit comprising an external principally ring-shaped part 1 and an internal principally ring-shaped part 7, where the external part 1 forms a housing that surrounds the internal part 7 in the radial direction and where it also at least partially surrounds the internal part 7 in the axial direction. The external ring-shaped part 1 comprises an internal contact surface 2, which also is principally ring-shaped, and two wings 3 and 4 that are diametrically located and protrude radially inwards. The external ring-shaped part comprises also two side walls 5 and 6 that protrude downwards and radially inwards outside of the wings 3 and 4 and that surround these wings (as is shown most clearly in FIG. 1a-FIG. 1c). The internal principally ring-shaped part 7 demonstrates a contact surface 8 that faces radially outwards, and two wings 9 and 10 that are diametrically located and protrude radially outwards from this. The external part 1 and the internal part 7 are mutually turnable around a centre of rotation R. The wings 3 and 4 of the external part 1 protrude radially inwards such that the surfaces of the wings 3, 4 that face radially inwards are in close connection with the contact surface 8 of the internal part 7 that faces outwards, and in a corresponding manner the wings 9 and 10 of the internal part 7 protrude radially outwards such that their surfaces that face outwards are in close connection with the contact surface 2 of the external part 1 that faces inwards. The surfaces of the wings 3, 4 of the external part that face inwards have a circular concave curvature, with a radius of curvature that corresponds to the radius of curvature of the outwardly facing circular convex contact surface 8 of the internal part. In a corresponding manner, the surfaces of the wings 9, 10 of the internal part that face outwards have a circular convex curvature, with a radius of curvature that corresponds to the radius of curvature of the inwardly facing contact surface 2 of the external part. It is appropriate that the play between the wings 9, 10 of the internal part and the inwardly facing contact surface 2 of the external part, as also the play between the wings 3, 4 of the external part and the outwardly facing contact surface 8 of the internal part, have a magnitude of the order of 0.01-0.04 mm. The wings 3, 4 and the wings 9, 10 have their principal extension in the circumferential direction.

As is made clear by FIG. 1, compartments or chambers 11, 12, 13, 14 are formed between the external part 1 with its wings 3, 4 and the internal part 7 with its wings 9, 10, which chambers are limited by the internal contact surface 2, the inwardly facing sides of the side walls 5, 6, the outwardly facing contact surface 8 and the sides of the wings 3, 4 and 9, 10. The heights of the wings 3, 4 and of the wings 9, 10 in the radial direction thus correspond to the heights of the compartments or chambers 11, 12, 13, 14 in the radial direction, which height is a fraction of the radial dimension of the external part 1. An oil passage 15, 16 is connected to two of the chambers 12, 13 for the supply of hydraulic oil and for its removal, respectively, or vice versa. If oil is supplied to the chamber 12 through the oil passage 15, the pressure in this chamber will increase, which, if the internal part is fixed connected to a fitting, leads to the external part starting to turn in a clockwise direction through the volume of the chamber 12 increasing, while oil at the same time flows out of the chamber 13 through the oil passage 16 through the volume in this chamber 13 decreasing due to the rotation. Corresponding processes occur also in the chambers 14 and 11. Corresponding oil passages may be connected also to these chambers from an external supply, or through an internal system of passages as will be described in association with FIG. 3.

Figure 1A:
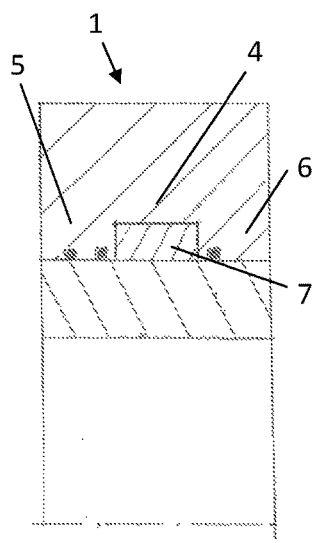
FIG. 1a shows one half of an axial section through the turnable unit along the line 1A-1A shown in FIG. 1.

Thus, FIG. 1a shows the right half of a section along the line 1A-1A in FIG. 1, and it is there made clear not only that the side walls 5, 6 of the external part 1 surround the internal part 7, but also that the inwardly facing surface of the wing 4 is in contact with the outwardly facing contact surface of the internal part 7.

Figure 1B:
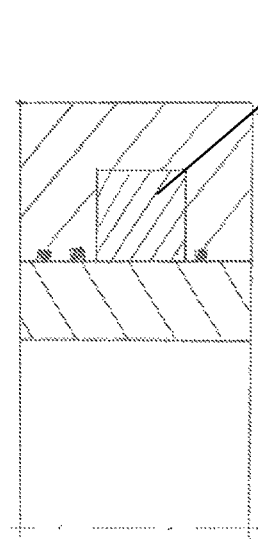
FIG. 1b shows one half of an axial section through the turnable unit along the line 1B-1B shown in FIG. 1.

FIG. 1b shows the upper half of a section along the line 1B-1B in FIG. 1, and in this case the wing 10 of the internal part is in contact with the inwardly facing contact surface 2 of the external part.

Figure 1C:
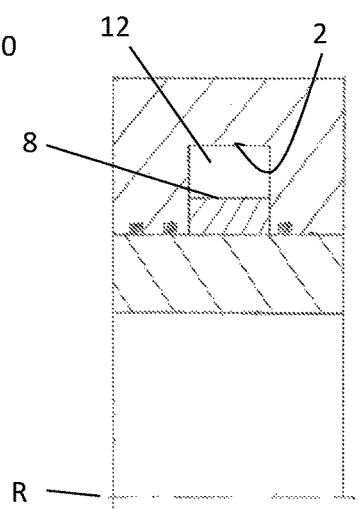
FIG. 1c shows one half of an axial section through the turnable unit along the line 1C-1C shown in FIG. 1.

FIG. 1c shows the upper half of a section along the line 1C-1C, and in this case the section does not pass through any of the wings, but what is seen is instead the section through the chamber 12, with the inwardly facing 2 and outwardly facing 8 contact surfaces of the external part and the internal part.

Figures 2, 2A:
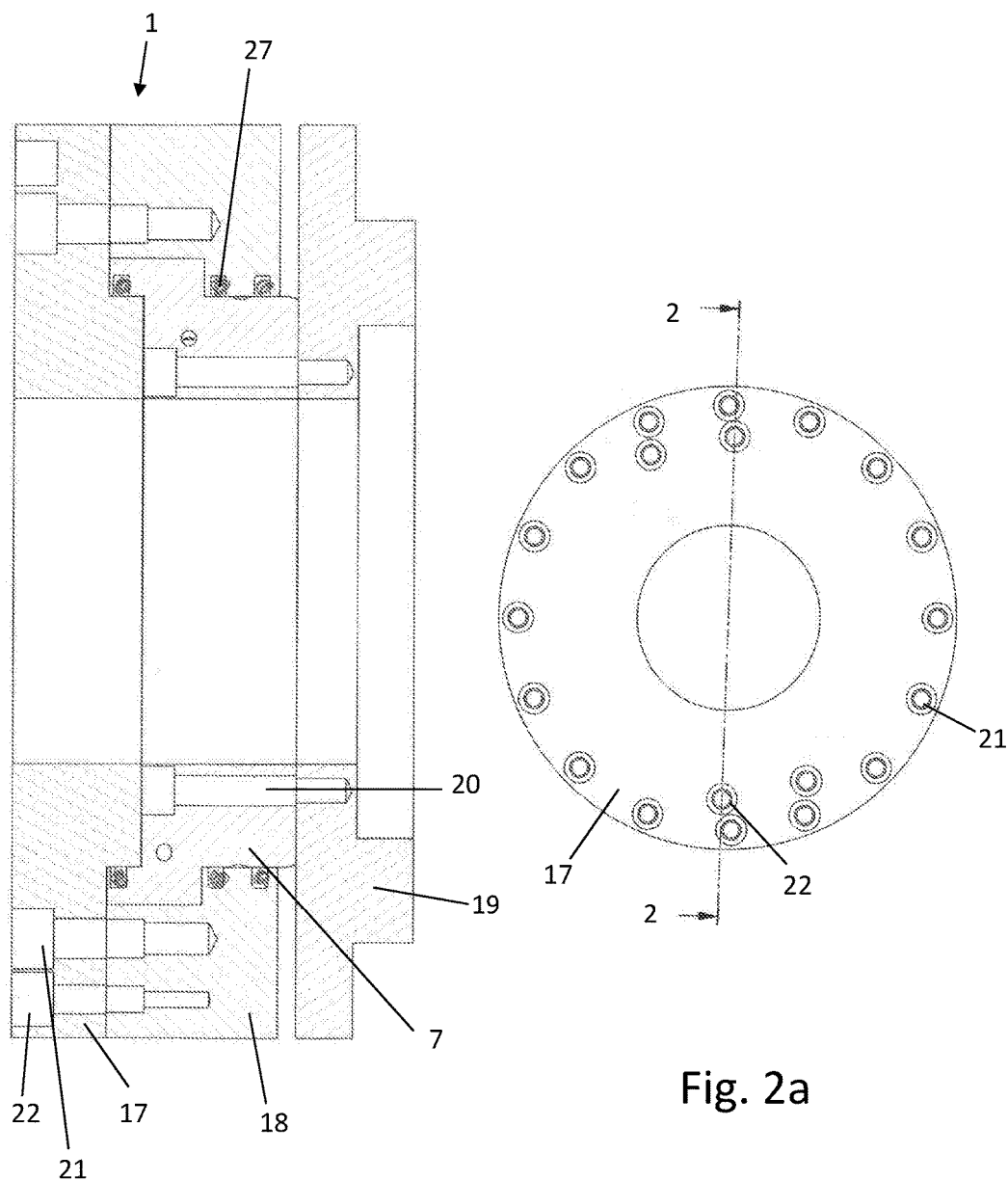
FIG. 2 shows a longitudinal section through the turnable unit shown in FIG. 1.
FIG. 2a shows an end view of the turnable unit shown in FIG. 2 where the dot-dash line 2-2 shows the location of the section shown in FIG. 2.

FIG. 2 shows a longitudinal cross-section through a turnable unit with a bearing arrangement according to the invention, taken along the section line 2-2 in FIG. 2a. The external part is here shown as a two-part ring, consisting of a side ring 17 and an external ring 18, where it is the external ring 18 that supports the wings 3, 4 that are shown in FIG. 1. Furthermore, the external ring 18 radially surrounds the internal ring-shaped part 7, which is in turn connected at its second side with a flange 19, by it being bolted to this with a bolt 20. The side ring 17 is bolted to the external ring 18 by means of bolts 21, arranged in a circle of bolts adjacent to the complete circumference of the two rings 17, 18. The side ring 17 is, furthermore, also bolted to the wings 3, 4 of the external ring by means of bolts 22 in order to increase the rigidity of the connection with these wings.

FIG. 2a shows an end view of the bearing arrangement shown in FIG. 2 as would be seen from the left of this drawing. Thus, it is the front surface of the side ring 17 that is seen, and the bolts 22 that connect the side ring 17 with the wings of the external ring are located on this circle of bolts with the bolts 21, and inside of this circle at the locations of the wings 3, 4. Also the position of the section, as it is shown in FIG. 2, is shown in the drawing by the dot-dash line 2-2.

Figure 3:
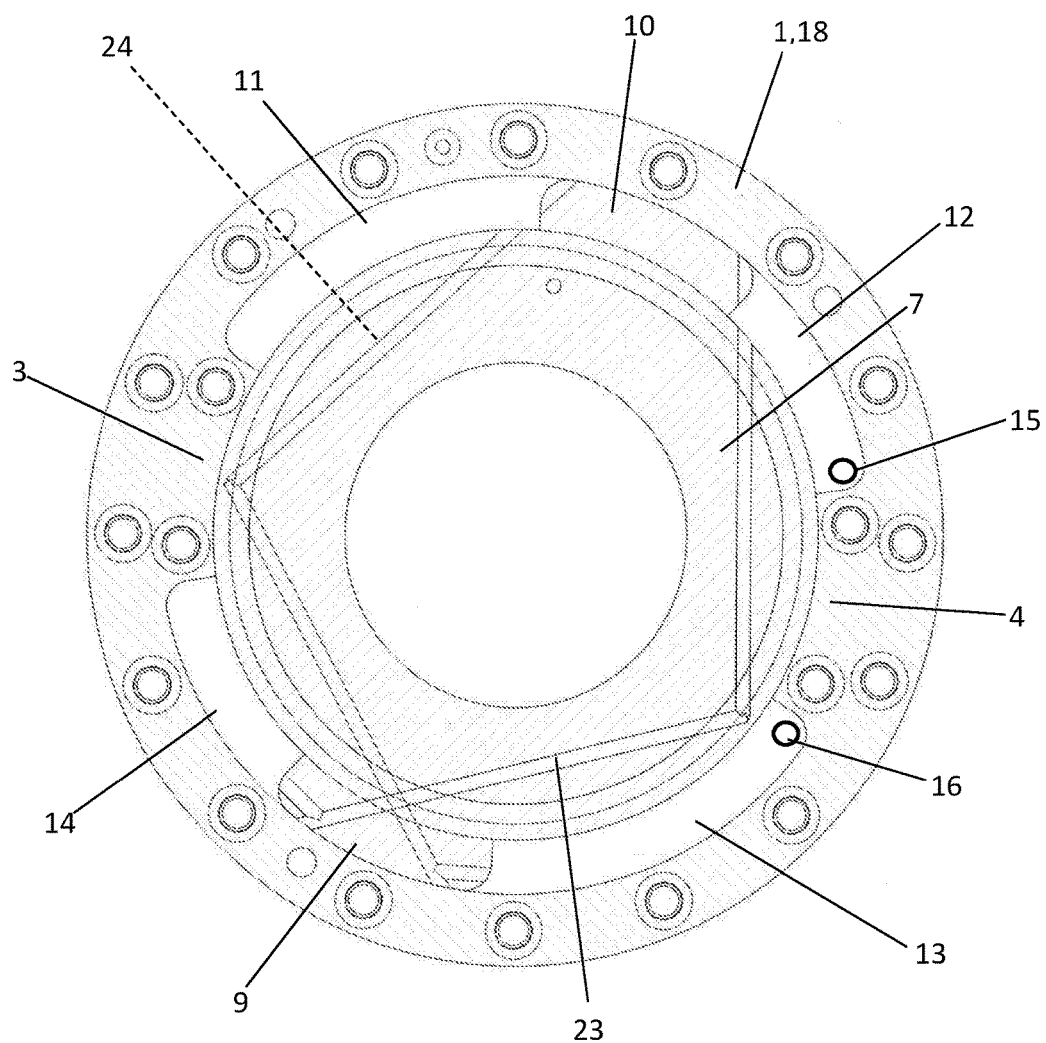
FIG. 3 shows a cross-section through the turnable unit shown in FIG. 1 at another axial position.

Also FIG. 3 shows a cross-section through the turnable unit, to be more precise a cross-section through the external ring 18 and the internal part 7. Thus, the drawing shows the two inwardly directed wings 3, 4 of the external ring 18, and the holes 21' for the bolts of the circle of bolts and the holes 22' for the bolts that are to be connected to the wings. At the internal part 7, the drawing shows the two outwardly directed wings 9, 10 of this part. The drawing shows also the chambers 11, 12, 13, 14 that have been formed between the external ring, the internal part and the wings. The drawing, however, is intended to show in particular the internal system of passages that is preferably arranged for the supply of oil between the chambers. This system of passages comprises a first transverse passage 23 that joins the chamber 12 with the chamber 14, and a second transverse passage 24 that joins the chambers 11 and 13 to each other. The second transverse passage 24 is shown in the drawing by dashed lines since it is located in a deeper axial plane when the arrangement is viewed as in the drawing. When oil under pressure is supplied to the chamber 12 through the oil passage 15, this oil will flow from the chamber 12 through the transverse passage 23 and into the chamber 14, and, since the chambers 12 and 14 will in this case be enlarged in the circumferential direction, the chambers 11 and 13 will instead be reduced in volume, and oil will then flow from the chamber 11 through the second transverse passage 24 to the chamber 13 and through the oil passage 16 out of the chamber to a connected oil tank.

Figures 4, 4A:
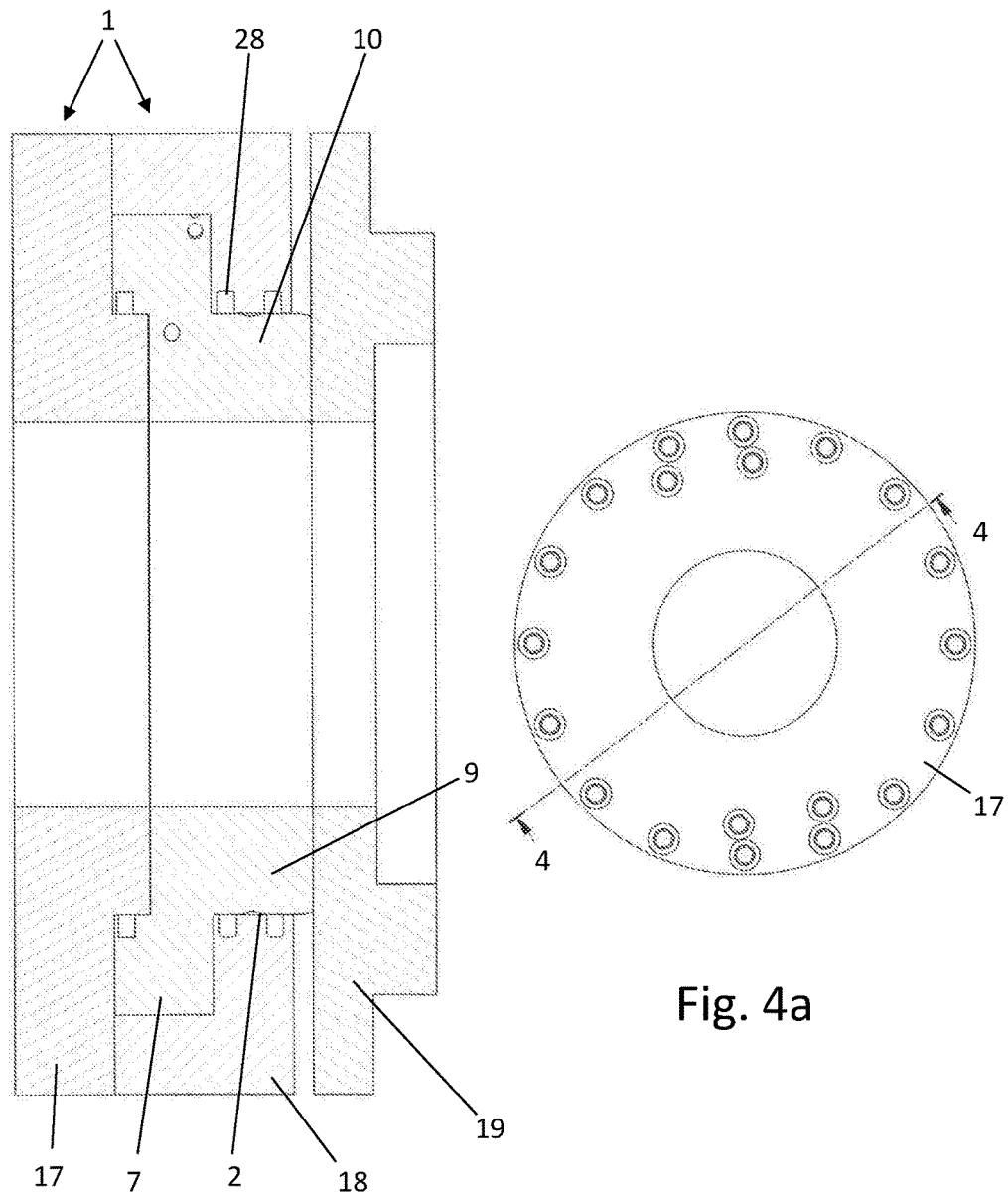
FIG. 4 shows a longitudinal section through the turnable unit shown in FIG. 1 at a position other than that shown in FIG. 2.
FIG. 4a shows an end view of the turnable unit shown in FIG. 4 where the dot-dash line 4-4 shows the location of the section shown in FIG. 4.

FIG. 4 shows a section similar that in FIG. 2, but in a different angular position as is made clear by the dot-dash line 4-4 in FIG. 4a. It is here made clear that the section passes through a part that includes the two wings 9, 10 of the internal part 7, where these are in contact with the inwardly facing contact surface 2 of the external part.

Figure 5:
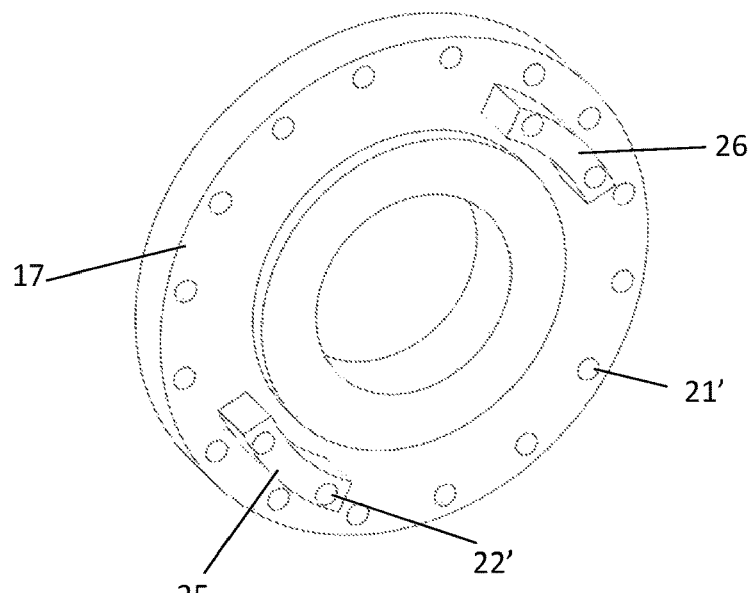
FIG. 5 shows a perspective view of a side part of the turnable unit according to the invention in another embodiment.
Figure 5A:
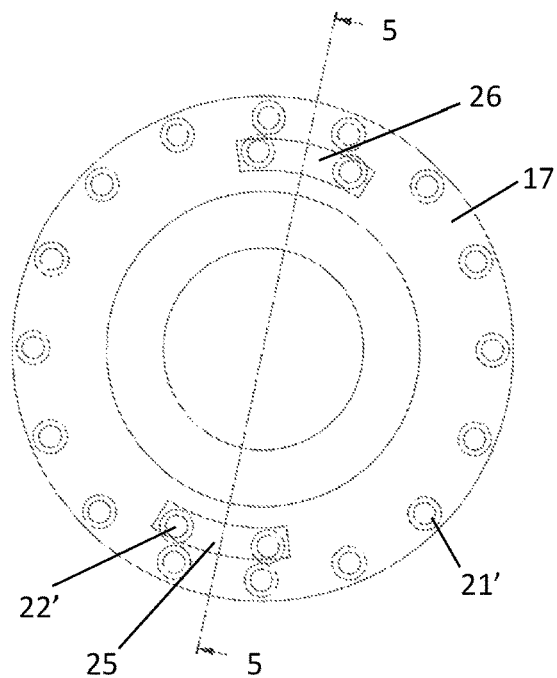
FIG. 5a shows a frontal view of the side part shown in FIG. 5.
Figure 5B:
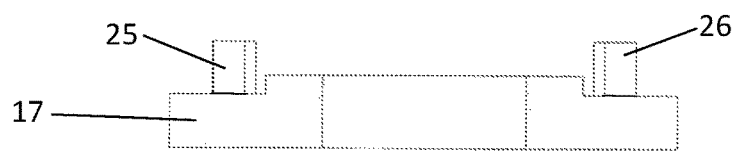
FIG. 5b shows a cross-section through the side part shown in FIG. 5a along the dot-dash line 5-5.

FIG. 5 shows an alternate design of the side ring 17 of the external part 1, and removable wings 25, 26 are arranged at the front surface on the inner surface of the side ring, i.e. on the surface that faces inwards into the turnable unit. The removable wings 25, 26 are connected with the side ring 17 through bolts inserted through the holes 22' and tightened in the removable wings. An external ring 18 can subsequently be mounted fixed at this side ring 17 with the aid of bolts inserted into the bolt holes 21' in the circle of bolts. Also an internal part 7 is mounted such that it is held fixed by the external ring 18, in order to form a unit that is in principle similar to that shown in the other drawings. Also the wings arranged at the internal part may be arranged in a corresponding manner as the wings 25, 26 at the side ring 17. A turnable unit of this type, however, may not be subject to the same high pressure as the embodiments shown in the other drawings.

As is made clear by several of the drawings, sealing rings 27 are arranged in grooves 28 in contact surfaces between the external part and the internal part, although these contact surfaces are not subject to the same pressure that causes wear that occurs between the other contact surfaces 2, 8 and the wings, and the play at the locations at which these seals 27 are arranged is greater than the play that can be accepted in order to achieve the hydrostatic pressure that seals against the wings.

It has been mentioned above that the embodiments of the invention shown here have been constructed for a reciprocating rotary motion of a saw blade. In such an application, thus, either one or the other of the external part and the internal part is connected to the saw blade. This can then, with the design shown here, be rotated with the saw blade in a reciprocating motion through an angle that is in practice not greater than approximately 60°, with four wings arranged in the turnable unit. The second part is in this case fixed connected with a shaft, with a centre of rotation R as has been mentioned above, and in this application the shaft that is connected with the second part is a hollow shaft that can, in turn, surround a further shaft that can rotate within the hollow shaft and that is required to be arranged in order to drive the chain of the saw blade.

It is obvious for one skilled in the arts that a bearing arrangement of the type that has been described above can be used for many applications in which two parts are to be mutually rotated and that function at relatively high pressure in order to be able to handle heavy loads. It is obvious for one skilled in the arts also that the arrangement can comprise only one wing on each part, or more than two wings on each part. In general, the greater the number of wings that the unit comprises, the higher the torque that can be achieved, while, however, at the same time the angle of rotation that can be used in the unit is reduced by a corresponding degree.

If the bearing arrangement is used as a pump, an external torque is instead applied to the external or internal part in order to rotate it, while the other of the two parts is stationary, and in this case hydraulic oil can in a corresponding manner be pumped at high pressure through the chambers being alternately caused to expel oil at a high pressure.

The invention claimed is:

1. A bearing arrangement for a unit that is mutually turnable around a centre of rotation, comprising an external part and an internal part, which achieves a reciprocating rotary motion in presence of high hydraulically acting pressure, whereby the external part is provided with side walls arranged to axially surround at least a part of the internal part, and whereby the external part comprises a radially inwardly arranged and essentially surrounding cavity in which the internal part is arranged such that it can be rotated, which cavity is limited in the circumferential direction by at least one wing that protrudes inwards from the external part and also limited by at least one wing that protrudes radially outwards from the internal part, which wings limit at least two compartments or chambers between the external part and the internal part, wherein at least one of the side walls of the external part is fixed connected with the at least one wing that protrudes radially inwards towards the internal part, which wing demonstrates a surface that faces radially inwards and that has a circular concave curvature for connection with an outwardly facing circular convex contact surface at the internal part.

2. The bearing arrangement according to claim 1, wherein the side walls of the external part are bolted fixed to each other, whereby one of the side walls is bolted fixed also at the at least one wing that protrudes radially inwards towards the internal part.

3. The bearing arrangement according to claim 1, wherein one of the side walls is designed integrated with the at least one wing that protrudes radially inwards towards the internal part.

4. The bearing arrangement according to claim 1, wherein two side walls of the external part are designed as one piece and the at least one wing that protrudes radially inwards towards the internal part is designed by the milling of a groove that passes round the circumference and that connects to the at least one wing.

5. The bearing arrangement according to claim 1, wherein the external part comprises two wings that protrude radially inwards towards the internal part, and that the internal part comprises two wings that protrude radially outwards towards the external part, whereby the wings limit four compartments or chambers between the external part and the internal part.

6. The bearing arrangement according to claim 5, wherein two diametrically located compartments or chambers are pairwise connected with each other through pressure-equalisation passages that pass through the internal part.

7. The bearing arrangement according to claim 1, wherein the external part and the internal part are arranged surrounding a shaft, whereby either the external part or the internal part is connected to the shaft to not allow rotation.

\* \* \* \* \*